United States Patent Office 3,214,358
Patented Oct. 26, 1965

3,214,358
ISOBUTYLENE-DIENE COPOLYMERIZATION BY LOW TEMPERATURE IRRADIATION
Gaetano F. D'Alelio, South Bend, Ind., assignor, by direct and mesne assignments, to Dal Mon Research Co., Cleveland, Ohio, a corporation of Delaware
No Drawing. Filed Jan. 29, 1960, Ser. No. 5,367
11 Claims. (Cl. 204—154)

This invention relates to the copolymerization of isobutylene with various dienes. More specifically, it relates to such copolymerizations caused by irradiation.

It has been found necessary in the preparation of solid copolymers of isobutylene containing minor amounts of dienes, such as butadiene-1,3, isoprene, divinyl benzene, divinyl toluene, etc., that ionic catalysts, such as boron trifluoride, aluminum chloride, titanium tetrachloride, stannic chloride, etc., are required, as well as the use of low temperatures. For example, butyl rubber is produced commercially from isobutylene containing 2–7 percent butadiene or isoprene at temperatures in the neighborhood of −80° C. with boron trifluoride or aluminum trichloride as the catalyst. However, the use of ionic type catalysts require a complicated, expensive post-treatment of the copolymers to remove catalyst residues. Peroxy-type catalysts such as benzoyl peroxide, the persulfates, etc. and the azo-type catalysts as well, normally suitable for the polymerization of vinyl and vinylidene compounds, are unsatisfactory for the polymerization of mixtures containing such high proportions of isobutylene.

It has been proposed heretofore to prepare polymerization products of isobutylene by irradiation but the yield of polymer is low and the process is uneconomical. It has also been further proposed to irradiate the isobutylene in the presence of certain inorganic oxides, and though an increase in yield is obtained, an expensive post-treatment is required to extract the polymer from the large quantities of inorganic oxides required to obtain high yields of polymer.

In accordance with the present invention, copolymers of isobutylene with one or more compounds having two vinyl or vinylidene groups, particularly the various dienes, including, for example, butadiene-1,3, isoprene, 2,3-dimethyl-butadiene-1,3, 2-phenyl-butadiene-1,3, chloroprene, divinyl benzene, diisopropenyl benzene, divinyl toluene, divinyl naphthalene, divinyl diphenyl, etc., can be prepared in improved yields by treatment of the mixture of monomers with 0.1 megarep or more of irradiation at a temperature below −40° C. and preferably below −60° C., in the presence of organic compounds selected from the class of cycloaliphatic hydrocarbon compounds and aliphatic ethers.

In accordance with the practice of this invention high yields of polymerization products are obtained in the presence of these cycloaliphatic compounds and aliphatic ethers, although the efficiency of the polymerization and the yield of polymer is also proportional to some extent to the irradiation dosage applied.

The molecular weight of the copolymers obtained in the practice of this invention is comparable with the molecular weight ranges obtained by the present method of polymerizing isobutylene-diene mixtures with ionic catalysts, such as boron trifluoride and aluminum chloride; and likewise, higher molecular weight products are obtained when lower temperatures are used. Products having molecular weights of 10,000 to 500,000 and higher can be obtained by this method, and temperatures below −60° C., e.g., at −100° C. or below, being advantageous for the highest molecular weights. The copolymer products obtained by irradiation can be treated and used in the same manner as in present practice to prepare butyl rubber for use in automobile tire tubing, tire linings, electrical cable insulation, water barrier films, moldings, laminations, adhesives, etc.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the production of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymerizable materials, and the shorter is the time of exposure required to accomplish the desired result. For other types of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (m.e.v.). In addition to radiations of this type, commonly called X-ray, an ionizing electromagnetic radiation suitable for the practice of this invention can be obtained by means of a nuclear reactor (pile) or by the use of natural or synthetic radioactive material, for example, Cobalt 60.

Various types of high power electron linear accelerators are commercially available, for example, from Applied Radiation Corporation, Walnut Creek, California. In the following Example I, ARCO-type travelling wave accelerator, model Mark I, operating at 3 to 10 million electron volts, was used to supply the irradiation. Other types of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual," edited by Theodore Rockwell III, and published by D. Van Nostrand Company, Inc., 1st edition, 1956, as that radiation dosage which produces energy absorption in human tissue equal to 93 ergs per gram of tissue.

The cycloaliphatic hydrocarbon compounds used in the practice of this invention are aliphatic carbocyclic rings substantially free of unsaturation and aromatic substitution and possessing three to twelve carbon atoms in the ring. Because of availability, carbocyclic compounds containing 5, 6, or 7 carbon atoms in the ring are preferred, especially the six-membered ring compounds which are readily prepared by the hydrogenation of unsubstituted and the substituted benzene ring compounds. Typical cycloaliphatic compounds, falling within the scope of this invention are cyclopropane, cyclobutane, methylcyclobutane, dimethylcyclobutane, trimethylcyclobutane, tetramethylcyclobutane, ethylcyclobutane, butylcyclobutane, cyclopentane, methylcyclopentane, the dimethylcyclopentanes, trimethylcyclopentanes, tetramethylcyclopentanes, pentamethylcyclopentanes, ethylcyclopentane, isopropylcyclopentane, propylcyclopentane, cyclohexane, methylcyclohexane, the dimethylcyclohexanes, the trimethylcyclohexanes, the tetramethylcyclohexanes, pentamethylcyclohexane, hexamethylcyclohexane, ethylcyclohexane, the diethylcyclohexanes, the triethylcyclohexanes, the tetraethylcyclohexanes, pentaethylcyclohexane, hexaethylcyclohexane, the isopropylcyclohexanes, the propylcyclohexanes, the butylcyclohexanes, the hexylcyclohaxanes, the octylcyclohexanes, the nonylcyclohexanes, the dodecylcyclohexanes, cycloheptane, the monoalkylcyclopeptanes, the polyalkylcycloheptanes, cyclooctane (hydrogenated cyclic tetramer of acetylene), cyclododecane (hydrogenated cyclic trimer of butadiene), trimethylcyclododecane (hydrogenated diphenyl), dicyclohexylmethane (hydrogenated diphenyl methane), 1,1-dicyclohexylethane (hydrogenated 1,1-diphenyl ethane), 1,2-dicyclohexylethane (hydrogenated sym. diphenyl ethane), decalin (hydrogenated naphthalene), methyldecalin (hydrogenated methylnaphthalene), dimethyldecalin, dipropyldecalin, diisopropyldecalin, octyldecalin, nonyldecalin, dodecyldecalin, etc.

The aliphatic ether compounds used in the practice of this invention are aliphatic ethers substantially free of unsaturation and aromatic substitution and may be cyclic and acyclic compounds, as for example, dimethyl ether, methyl ethyl ether, diethyl ether, diisopropyl ether, dibutyl ether, diamyl ether, diisoamyl ether, dioctyl ether, dinonyl ether, ethyl isopropyl ether, ethyl propyl ether, ethyl butyl ether, ethyl isobutyl ether, ethyl heptyl ether, ethyl octyl ether, ethyl cetyl ether, dicetyl ether, methylcyclohexyl ether, ethylcyclohexyl ether, propylcyclohexyl ether, isopropylcyclohexyl, ether, dicyclohexyl ether, dimethylcyclohexyl ether, methyl-methylcyclohexyl ether, di-isopropylcyclohexyl ether, dicyclopentyl ether, dicyclopeptyl ether, terahydrofurane, tetrahydropyran, di-tetrahydrofurfuryl ether, methyltetrahydrofurfuryl ether, cyclohexyltetrahydrofurfuryl ether, ethyleneglycol dimethyl ether, propyleneglycol dimethyl ether, ethyleneglycol diisopropyl ether, ethyleneglycol dicyclohexyl ether, 1,6-dimethoxyhexane, 1,6-diethoxy hexane, diethyleneglycol dimethyl ether, diethyleneglycol diethyl ether, diethyleneglycol dibutyl ether, dioxane, methyldioxane, methoxydecalin, ethoxydecalin, methoxycyclohexyl cyclohexane, 6,6'-dimethoxydicyclohexyl, dimethoxybutylene glycol, etc.

The saturated aliphatic cyclic hydrocarbons, cyclic ethers and acyclic ethers may be used alone or as mixtures with each other and in the presence or absence of other diluents or solvents such as propane, the butanes, the pentanes, the hexanes, the heptanes, etc., as well as the aromatic hydrocarbons, such as benzene, toluene, the xylenes, etc.

Many of the saturated aliphatic cyclic hydrocarbons, cyclic ethers and acyclic ethers used in the practice of this invention have melting points higher than the temperatures used in the practice of this invention, for example, cyclohexane melts at 6.5° C. and dioxane melts at 11.8° C. and when used as the sole solvent are solids, whereas others such as methylcyclohexane, which melts at −126° C., 1,3 dimethylcyclohexane melting at −85° C., 1,4 dimethyl cyclohexane, melting at −86° C., diethyl ether, melting at −116.3° C. and diisopropyl ether melting at −85° C., are liquids; it has been found that even in the frozen solid state these compounds are effective in increasing the yield of polymer. In batch polymerization process both the liquid and solid compounds may be used, but in continuous processes the liquid compositions are not only preferred but desirable and in such case the melting point many be depressed by using a mixture of hydrocarbons or ethers or by selecting suitable hydrocarbons or ethers having melting points lower than the polymerization temperature employed. As indicated hereinabove, the polymerization generally is performed at temperatures below −40° C. and preferably between −60° C. and −100° C. even though some polymerization occurs at temperatures higher than −40° C., for example, at −20° C., the yield of polymer and molecular weight are greatly reduced as the temperature is raised. It has also been found in the practice of this invention that within the above temperature ranges, increased yields are obtained in the copolymerization of isobutylene with mono-vinyl and monoisopropylenyl aryl compounds, thereby permitting the production also of tripolymer composition with dienes mentioned hereinabove. Typical examples of the monovinyl aryl and monoisopropenyl compounds are styrene, the alkylated styrenes (e.g. o-, m-, p-methylstyrene, o-, m-, p-ethyl styrene, etc.), alpha-methyl styrene, o-, m-, p-methyl-alpha-methyl styrene, isopropenyl benzene, alpha-vinyl naphthalene, beta-vinyl naphthalene, etc.

The copolymers of this invention can be modified further by the presence during preparation of one or more additional monomers, preferably in a minor amount of an alkene-1, for example, propene-1, butene-1, pentene-1, hexene-1, etc.

In the practice of this invention, some copolymerization can be effected with less than 0.1 megarep. It is generally advantageous, however, to use dosages of at least 0.1 megarep, and preferably one magarep or more. Generally the advantages of this invention can be effected without exceeding 200 megareps in irradiation dosages.

The monomer mixture to be treated is advantageously contained in a material such as aluminum or glass which will not interfere substantially with the irradiation. Polymeric materials such as low or high density polyethylene, polypropylene, polybutene-1, etc., as well as irradiated crosslinked polyolefins, nylon, polyethylene terephthalate, etc., can also be used.

Various methods of obtaining the low temperatures required in the practice of this invention are well known in the art. For example, solid carbon dioxide, liquid nitrogen, liquid air, liquid propane, etc., can be used to cool the vessel in which the monomer mixture is contained. In commercial installations, systems can be used similar to those presently being used in the production of isobutylene-diene copolymers for the production of butyl rubber.

Also, since the polymerization is somewhat inhibited by the presence of oxygen or air, the polymerization is best performed with reagents free of air or oxygen and in an oxygen-free atmosphere.

The following examples are given by way of illustration and not by way of limitation of the present invention.

Example I

A mixture of 97 parts of isobutylene, 3 parts of butadiene is cooled to a temperature of approximately −78° C., and separate portions of the mixture are exposed to 0.4, 0.6 and 1 megarep of irradiation from an electron linear accelerator. The temperature of the mixture is allowed to come to room temperature and the unreacted monomers allowed to escape by evaporation and the polymer dried to constant weight. It is found that only 2.0, 3.0 and 5.0% of the monomer mixture polymerized to solid rubbery materials at 0.4, 0.6 and 1.0 megarep dose respectively.

Example II

The procedure of Example I is repeated in the presence of 200 parts of benzene and conversions to solid polymers similar to those in Example I are obtained.

Example III

The procedure of Example I is repeated in the presence of 200 parts of propane and conversions similar to those in Example I are obtained.

Example IV

The procedure of Example I is repeated in the presence of 200 parts of cyclohexane and 8, 12 and 20% conversions to solid polymers are obtained. When 400 parts of cyclohexane are used for 100 parts of monomer mixture, a 40–45% conversion to solid polymer is obtained at 1 megarep dosage. At 5 megareps a conversion to solid polymers of greater than 60% is obtained.

Example V

The procedure of Example IV is repeated using 400 parts of cyclohexane with the following mixtures of monomers:

| Isobutylene, parts: | Butadiene, parts |
|---|---|
| 99 | 1 |
| 98 | 2 |
| 96 | 4 |
| 95 | 5 |
| 93 | 7 |
| 90 | 10 | and the conversions to solid polymers are similar to those of Example IV, and greater than in the absence of cyclohexane.

Example VI

The procedure of Example V is repeated using isoprene instead of butadiene with similar results.

Example VII

The procedure of Example IV is repeated with similar results, using 5 parts of divinyl benzene in place of butadiene.

Example VIII

The procedure of Example VII is repeated using 10 parts of diisopropenyl toluene. Apparently, because of the higher proportion of the diene, a more rigid product is obtained than in Example VII.

Example IX

The procedure of Example V is repeated, with similar results, using a dosage of 5 megareps from a cobalt-60 source.

Example X

The procedure of Example V is repeated, with similar results, using an irradiation dosage of 10 megareps from bombarded beryllium.

Example XI

The procedures of Examples IV to X are repeated using cyclopentane, methyl cyclohexane, dimethyl cyclohexane, ethyl cyclohexane, diethyl cyclohexane, trimethylcyclohexane, pentamethyl cyclohexane, cyclopentane and similar results are obtained.

Example XII

The procedure of Example IV is repeated at −60° C. with the addition of 10 parts of styrene and a more rigid copolymerization product is obtained.

Example XIII

A mixture of 93 parts isobutylene, 7 parts of isoprene, 1000 parts of methylcyclohexane is deoxygenated and cooled to −70° C. to −80° C. and passed continuously through an aluminum reactor tube exposed to a directed beam of a 3 mev. linear electron accelerator at a rate so that the monomer mixture receives one megarep dose of irradiation. From the irradiated mixtures, the low boiling unconverted monomers and the higher boiling methylcyclohexane are recovered, purified and recycled, and the copolymer isolated as a clear, colorless, vulcanizable composition.

Example XIV

Example XIII is repeated using butadiene instead of isoprene and 400 parts of dimethylcyclohexane dissolved in 600 parts of butane instead of 1000 parts of methyl cyclohexane with similar results.

Example XV

A mixture of 93 parts isobutylene, 7 parts of isoprene, 500 parts of diisopropyl ether is deoxygenated and cooled to −70° C. and exposed to 1 megarep of irradiation as in the process of Example I and a 40% conversion to solid polymer is obtained.

Example XVI

Example XV is repeated using 1000 parts of diethyl ether and 2 megareps of irradiation and a 52% conversion to solid polymer is obtained.

Example XVII

Example XVI is repeated using 500 parts of diethyl ether and 500 parts of methylcyclohexane with similar results.

Example XVIII

When dioxane is used instead of the diethyl ether of Examples XVI and XVII, similar results are obtained.

Example XIX

The procedures of Examples XV to XVIII are repeated using dimethyl ether, dibutyl ether, ethylcyclohexyl ether, tetrahydrofuran and ethylene glycol dimethyl ether with similar results.

The parts and percentages recited herein are parts and percentages by weights unless otherwise specified. Though small amounts, of the order of 1% or less of the cycloaliphatic hydrocarbon and aliphatic ethers used in the foregoing examples, are effective in the practice of this invention, I prefer to use large quantities of about 10% or more, and particularly a large excess of the cycloaliphatic hydrocarbon or aliphatic ether or a mixture thereof, whereby they function also as the dispersion media for the monomers and copolymers.

While certain features of this invention have been described in detail with respect to the various embodiments thereof, it will, of course, be apparent that other modifications can be made within the spirit and scope of this invention, and it is not intended to limit the invention to the exact details shown above except insofar as they are defined in the following claims.

I claim:

1. A process for the preparation of isobutylene-diene copolymers comprising the treatment of a monomeric mixture comprising 99.5–80% by weight isobutylene and 0.5–20% by weight of at least one diene, based on the combined weight of monomers, with at least 0.1 megarep of irradiation at a temperature below −40° C. in the presence of at least one aliphatic saturated cyclic hydrocarbon.

2. A process of claim 1 in which said temperature is below −70° C.

3. A process of claim 1 in which saturated organic compound is a cyclohexane.

4. A process of claim 2 in which the saturated organic compound is a methyl cyclohexane.

5. The process of claim 1 in which the diene is butadiene.

6. The process of claim 1 in which the diene is isoprene.

7. The process of claim 1 in which the isobutylene is 99.5–90%, the diene is 0.5–10%, the temperature is below −65° C., the saturated aliphatic cyclic hydrocarbon is selected from the group consisting of cyclohexane and the lower alkyl cyclohexanes in which the alkyl groups contain no more than 5 carbon atoms and the radiation dosage is 0.5–50 megareps.

8. The process of claim 7 in which the diene is butadiene.

9. The process of claim 7 in which the diene is isoprene.

10. The process of claim 7 in which the diene is divinyl benzene.

11. The process of claim 7 in which the alkyl cyclohexane is methylcyclohexane.

References Cited by the Examiner

UNITED STATES PATENTS

| 2,982,706 | 5/61 | Lemiszka et al. | 204—154 |
| 2,996,441 | 8/61 | Nelson et al. | 204—154 |
| 3,012,950 | 12/61 | Anderson | 204—154 |
| 3,037,010 | 5/62 | Harris | 204—154 |
| 3,089,832 | 5/63 | Black et al. | 204—154 |

FOREIGN PATENTS

| 665,262 | 1/52 | Great Britain. |

OTHER REFERENCES

Schildknecht: Vinyl and Related Polymers, published by Wiley & Sons, 1952, pages 571–580.

MURRAY TILLMAN, *Primary Examiner.*

J. R. SPECK, *Examiner.*